(12) United States Patent
Read (10) Patent No.: US 8,894,530 B1
(45) Date of Patent: Nov. 25, 2014

(54) HYPOCYCLOIDAL CRANK APPARATUS

(76) Inventor: Thomas M. Read, Bristol, CT (US)

( * ) Notice: Subject to any disclaimer, the term of this patent is extended or adjusted under 35 U.S.C. 154(b) by 1218 days.

(21) Appl. No.: 12/761,480

(22) Filed: Apr. 16, 2010

Related U.S. Application Data (60) Provisional application No. 61/172,815, filed on Apr. 27, 2009.

(51) Int. Cl.
*F16H 37/02* (2006.01)
(52) U.S. Cl.
USPC .......................................... 475/210; 123/197.4
(58) Field of Classification Search
USPC .................. 74/49, 51, 52, 595, 602; 475/331;
123/197.1, 197.3, 197.4
See application file for complete search history.

(56) References Cited

U.S. PATENT DOCUMENTS

| | | | |
|---|---|---|---|
| 4,657,488 A | 4/1987 | Weinhandl | |
| 5,158,046 A * | 10/1992 | Rucker | 123/65 R |
| 5,233,949 A * | 8/1993 | Rucker | 123/71 R |
| 5,560,267 A * | 10/1996 | Todd et al. | 74/604 |
| 5,927,236 A * | 7/1999 | Gonzalez | 123/78 F |
| 6,012,423 A | 1/2000 | Fischer | |
| 6,418,893 B1 * | 7/2002 | Auchter et al. | 123/90.15 |
| 6,510,831 B2 | 1/2003 | Wiseman | |
| 6,540,428 B2 * | 4/2003 | Okabe et al. | 403/279 |
| 6,648,612 B2 | 11/2003 | Hsiao | |
| 7,185,557 B2 * | 3/2007 | Venettozzi | 74/602 |
| 7,640,910 B2 * | 1/2010 | Lemke et al. | 123/197.4 |
| 2006/0264294 A1 * | 11/2006 | Summa et al. | 475/210 |
| 2007/0215093 A1 * | 9/2007 | Lemke et al. | 123/197.4 |
| 2007/0281818 A1 * | 12/2007 | Nardelli | 475/168 |
| 2008/0041132 A1 * | 2/2008 | Gombas | 72/450 |

FOREIGN PATENT DOCUMENTS

| | | |
|---|---|---|
| EP | 1200712 | 2/2002 |
| WO | WO2006102314 | 9/2006 |
| WO | WO 2006102314 A2 * | 9/2006 |

* cited by examiner

*Primary Examiner* — Troy Chambers
*Assistant Examiner* — Alexander Vu
(74) *Attorney, Agent, or Firm* — UConn IP Law Clinic; Robert S. Smith; James R. Anderson (57) ABSTRACT

Disclosed is an improved hypocycloidal crank apparatus employing as a stator an internally toothed, continuous, synchronous belt. The apparatus is quiet, easily repaired, and does not require lubrication. It is useful for driving air pumps and the like.

4 Claims, 8 Drawing Sheets

HYPOCYCLOIDAL CRANK APPARATUS

CROSS-REFERENCE TO RELATED APPLICATION

Applicant claims the benefit of provisional U.S. patent application 61/172,815, filed Apr. 27, 2009, which application is incorporated herein in its entirety.

FIELD OF THE INVENTION

The present invention relates to an improved hypocycloidal cranking apparatus (Cardan Gear).

BACKGROUND OF THE INVENTION

A hypocycloidal cranking apparatus converts rotational motion into rectilinear motion. This apparatus can also operate in the reverse, transforming rectilinear motion into rotational motion to drive devices such as reciprocating piston engines.

In a typical hypocycloidal cranking apparatus, rotational motion is delivered to the device through an input shaft attached to a power source. A crank arm is affixed to the input shaft such that the crank arm rotates in unison with each rotation of the input shaft. A sprocket shaft is offset from the input shaft and is fixedly mounted within the crank arm. An external toothed orbiting member is rotatably mounted on the sprocket shaft, and the teeth of the orbiting member mesh with the teeth within an internal toothed stator member. An eccentric arm is fixedly mounted on the orbiting gear face such that the eccentric arm rotates in unison with each rotation of the crank arm, but in the opposite rotational direction. An output shaft or rod journal is offset from the eccentric arm.

As the input shaft rotates, the crank arm rotates and the sprocket shaft mounted orbiting member rotates within the internal toothed stator member, causing the loci of axis points on the output shaft to transcribe a straight line between the extreme positions of the output shaft. This rectilinear motion can be used to power a variety of devices, including but not limited to, air compressors.

In a typical hypocycloidal cranking apparatus the stator member is machined from a single piece of metal. (See e.g. Wiseman U.S. Pat. No. 6,510,831). Because a tight mesh is required between the teeth of the orbiting member and stator member, the teeth on these components are fabricated with high precision. Manufacture of this type of machined gear is costly, difficult, and time consuming. Improper engagement between the metal teeth of the orbiting member and the teeth of the stator member will result in high wear, vibration, noise and eventually fatigue failure of the gear teeth in one or both components. In addition, the metal on metal contact requires lubrication to reduce wear and damage to these components. In the event that the orbiting member or stator member is damaged, it must be replaced with a completely new component.

A recent published patent application (U.S. patent application Ser. No. 11/131,819) suggested the use of a chain or belt as a replacement for the conventional machined stator member. In this device, the chain or belt was sandwiched between a front and back ring and was not rigidly fixed on its outer circumference. The application suggested that the flexible chain or belt would prevent or reduce clogging of foreign material within the unit. While this is an appealing idea, a flexible stator member will not work in practice. The stator member must remain rigid in order to synchronize the motion of the orbiting member rotating within it. A hypocycloidal cranking apparatus operating within a flexible stator member would induce destructive oscillations in the device, potentially damaging the crank assembly.

The present invention provides an improved hypocycloidal cranking apparatus that avoids the disadvantages of the prior art by providing a stator member that is practical, inexpensive and easy to implement and maintain.

SUMMARY OF THE INVENTION

In the apparatus of the present invention the stator member is comprised of a continuous synchronous toothed belt seated within an inflexible flange and optionally within a trough in the inner circumference of the flange. The optional trough reinforces the outer circumference of the belt, creating a rigid structure within which the sprocket can rotate. The belt is made of an elastomeric and lubristic material, eliminating the need for lubrication. A sprocket serves as the orbiting member and its metal teeth engage with the elastomeric teeth of the belt. This metal-to-belt contact results in decreased noise, tooth wear and vibration. Because the belt used in the present invention is commercially available and thus need not be specially machined, repair of the stator member is significantly less expensive and time consuming than in conventional metal stator member configurations.

The construction and method of operation of the present invention, together with additional objects and advantages thereof, will best be understood from the drawings and detailed description of the invention that follow.

Figure 1A:
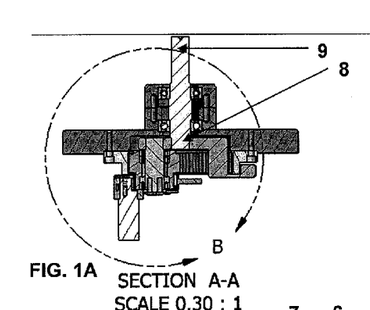
FIGS. 1A-1C: Diagrammatic Views of the Present Invention Detailing the Rotary Motion Shaft, Sprocket Shaft and Rod Journal
Figure 1B:
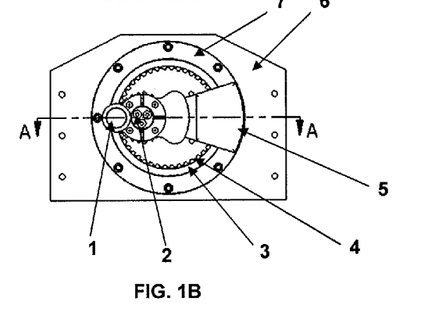
Figure 1C:
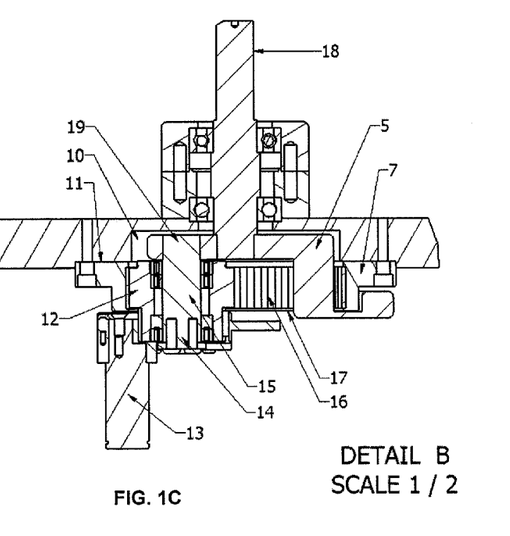

LIST OF REFERENCE NUMBERS USED IN THE FIGURES 1 rod journal receptacle of eccentric counterweight 2
2 eccentric counterweight
3 outer surface of continuous synchronous belt 16
4 inner toothed surface of continuous synchronous belt 16
5 crank arm assembly
6 crankcase housing
7 circular mounting flange
8 output end of rotary motion shaft 18

9 input end of rotary motion shaft 18
10 recessed area of crankcase housing 6
11 back face of circular mounting flange 7
12 toothed orbiting sprocket
13 rod journal
14 sprocket end of sprocket shaft 15
15 sprocket shaft
16 continuous synchronous belt
17 front face of circular mounting flange 7
18 rotary motion shaft
19 crank arm end of sprocket shaft 15
20 center axis of circular mounting flange 7
21 inner circumference of circular mounting flange 7
22 co-planar trough within the inner circumference 21 of circular mounting flange 7
23 counterweight end of crank arm counterweight 30
24 centerline of crank arm counterweight 30
25 arm end of crank arm counterweight 30
26 rotary shaft receptacle of crank arm counterweight 30
27 sprocket shaft receptacle of crank arm counterweight 30
28 rod journal end of eccentric counterweight 2
29 counterweight end of eccentric counterweight 2
30 crank arm counterweight
31 centerline of eccentric counterweight 2
32 counterweight mass of eccentric counterweight 2
33 counterweight mass of crank arm counterweight 30

DETAILED DESCRIPTION OF THE INVENTION

FIGS. 1A-1C and 2 illustrate the fully constructed hypocycloidal cranking apparatus of the invention. The device is comprised of three main assemblies: a synchronous belt assembly, a crank arm assembly, and a rod journal shaft assembly. The configuration and interrelation of each is described below.

Synchronous Belt Assembly

The synchronous belt assembly is comprised of a circular mounting flange 7 and a continuous synchronous belt 16. FIGS. 2-5 illustrate the distinctive details of the synchronous belt assembly. The circular mounting flange 7 has a front face 17, a back face 11, and an inner circumference 21. The back face 11 of the circular mounting flange 7 is secured to a crankcase housing 6 in such a manner to accommodate the rotation of the crank arm assembly 5. One embodiment, shown in FIGS. 3-4B, accommodates this rotation by way of a recessed area 10 having sufficient diameter and depth to provide clearance for the rotation of the crank arm assembly 5. The circular mounting flange 7 has a continuous co-planar trough 22 recessed within the perimeter of its inner circumference 21.

Figure 5:
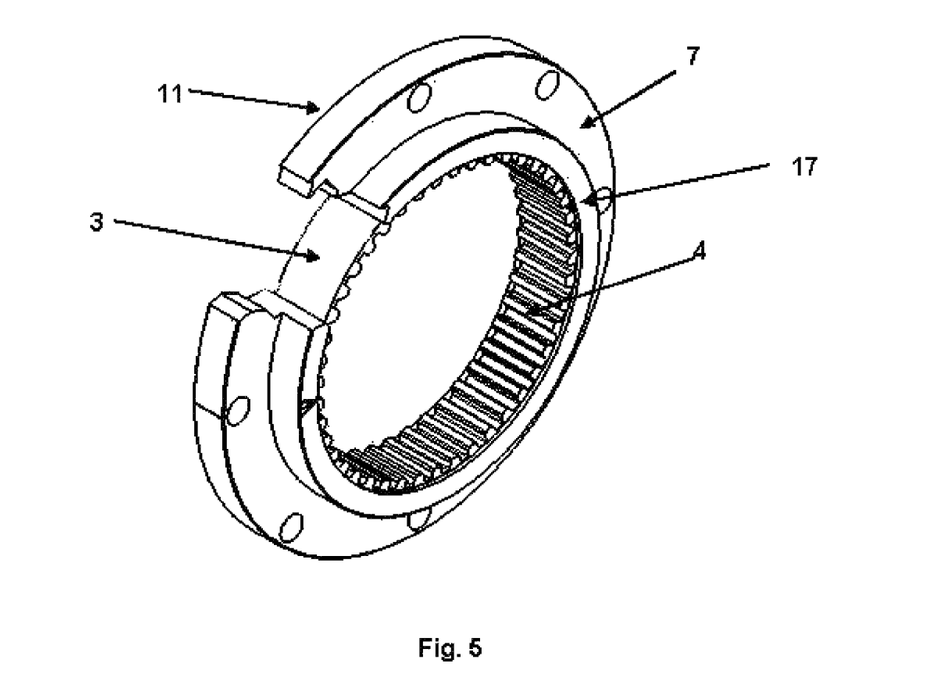
FIG. 5: Diagrammatic View of the Circular Mounting Flange Detailing the Inner and Outer Surfaces of the Continuous Synchronous Belt
Figure 6A:
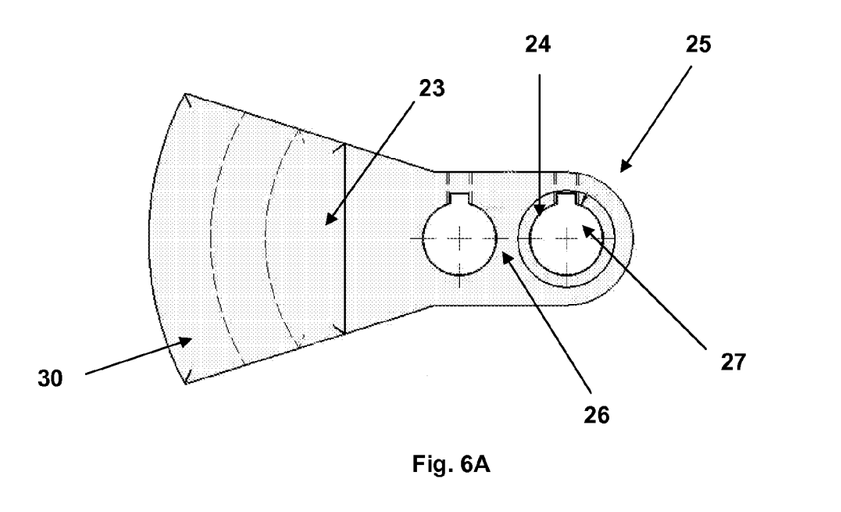
FIGS. 6A-6B: Diagrammatic Views of the Crank Arm Assembly
Figure 6B:
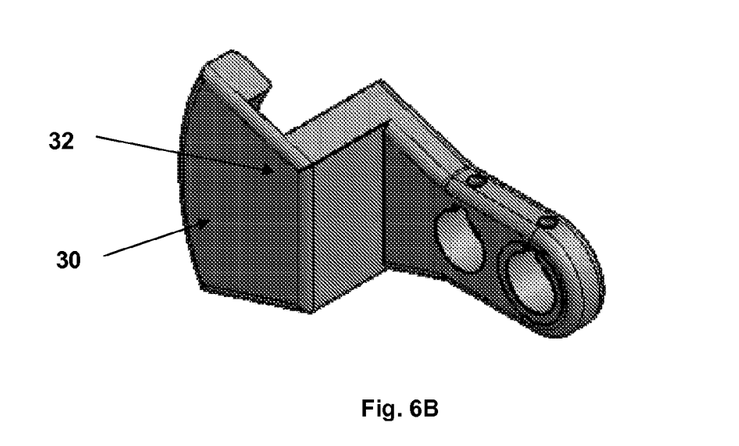
Figure 7:
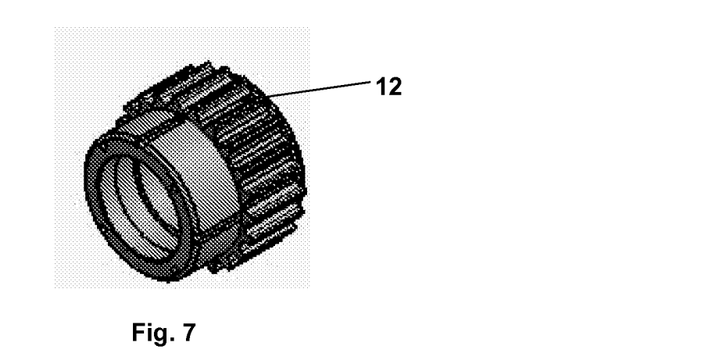
FIG. 7: Diagrammatic View of the Sprocket
Figure 8:
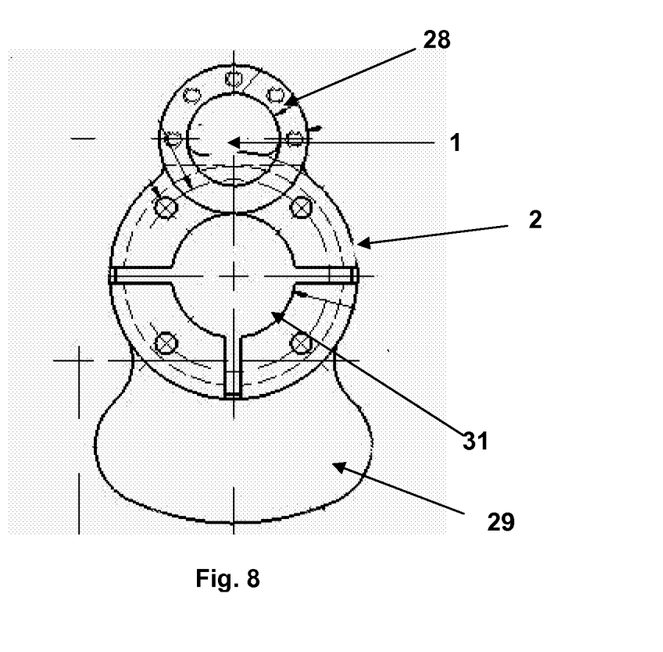
FIG. 8: Diagrammatic View of the Eccentric Counterweight
Figure 9:
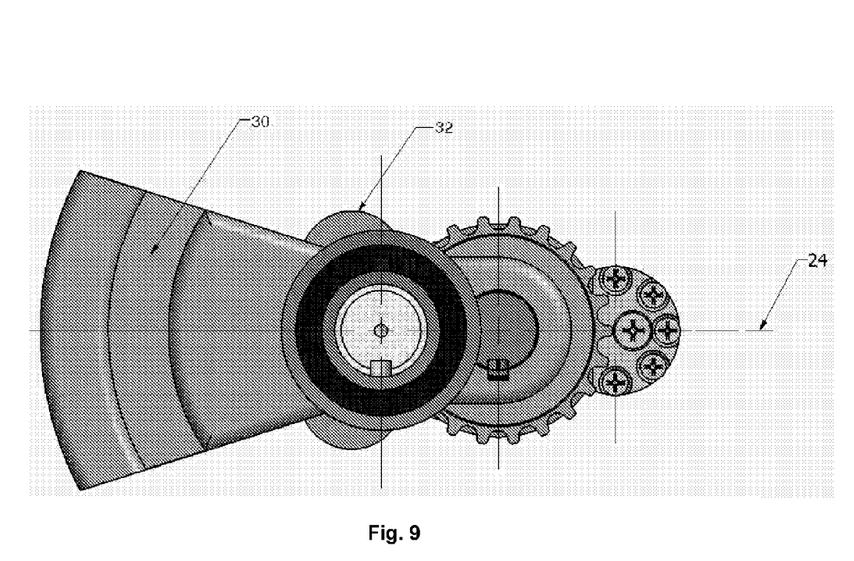
FIG. 9: Diagrammatic View of Crank Arm Counterweight Mass Positioning

The continuous synchronous belt 16 has an outer surface 3 and an inner toothed surface 4 having a defined pitch diameter and an even tooth count. The outer surface 3 of the continuous synchronous belt 16 is seated and mechanically secured within the trough 22 of the circular mounting flange 7 such that the inner toothed surface 4 of the belt 16 is exposed. The belt should be sufficiently lubristic to eliminate the need for crank case lubrication and should be sufficiently strong to withstand the forces imposed on it during operation. One example of a preferred belt is the Gates Poly Chain GT Carbon Belt system available from the Gates Corporation in Denver, Colo.

A rotary motion shaft 18, having an input end 9 and an output end 8, is positioned along the center axis 20 of the circular mounting flange 7. The input end 9 of the rotary motion shaft 18 is mechanically supported by the crankcase housing 6 and is adapted for connection to a power source. In one embodiment, shown in FIGS. 1A and 1C, the output end 8 of the rotary motion shaft 18 passes through a recessed area 10 within the crankcase housing 6 and terminates within the circular mounting flange 7.

In the embodiment disclosed in the Figures, the circular mounting flange 7 employs a trough 22 to improve the lateral support of the belt and to the root of the belt teeth. It should be noted that a trough 22 is not required; the continuous synchronous belt may be mechanically secured within the inner circumference of a circular mounting flange 7 having no trough.

Crank Arm Assembly

Referring now to FIGS. 1, 2 and 6A-6B, the crank arm assembly 5 is comprised of a crank arm counterweight 30 and sprocket shaft 15. The crank arm counterweight 30 has a rotary shaft receptacle 26 and a sprocket shaft receptacle 27 centered on the centerline 24 of the crank arm counterweight 30. The rotary shaft receptacle 26 is located between the counterweight end 23 and the sprocket shaft receptacle 27 of the crank arm counterweight 30. The input end 8 of the rotary motion shaft 18 is mechanically affixed within the rotary shaft receptacle 26. The sprocket shaft 15 has a crank arm end 19 and a sprocket end 14, the crank arm end 19 being mechanically fixed within the sprocket shaft receptacle 27.

Rod Journal Shaft Assembly

Referring now to FIGS. 1, 2, 7 and 8, the rod journal shaft assembly is comprised of a toothed orbiting sprocket 12 and an eccentric counterweight 2. The toothed orbiting sprocket 12 is rotatably mounted on the sprocket shaft 15, near the crank arm end 19 of the sprocket shaft 15. The sprocket 12 has a pitch diameter that is equal to one half the pitch diameter of the teeth of the continuous synchronous belt 16 and consequently has exactly one half the number of teeth as contained in the continuous synchronous belt 16.

The profile of the sprocket teeth is determined through use of an optical comparator. The continuous synchronous belt 16 is mounted within the trough 22 of the circular mounting flange 7 as shown in FIG. 5. This component is securely fixed within the comparator and illuminated such that the profile of the inner toothed surface 4 of the continuous synchronous belt 16 appears on a calibrated projection screen. A scaled image of the inner toothed surface 4 is recorded and used to create a scaled drawing of the tooth profile required to properly mate the orbiting sprocket 12. Proper mating occurs when at least one orbiting sprocket 12 tooth engages with the continuous synchronous belt 16.

The orbiting sprocket 12 tooth profile is a function of the constrained diameter of the continuous synchronous belt 16 fixed within the circular mounting flange 7; consequently, a different constrained continuous synchronous belt 16 diameter will produce a different orbiting sprocket 12 tooth profile. For instance, a continuous synchronous belt 16 having a diameter of 4.470 inches would preferably have the orbiting sprocket 12 tooth profile shown in FIGS. 11A-11B.

An eccentric counterweight 2 is fixedly mounted on the sprocket end 14 of the sprocket shaft 15 and has a rod journal end 28, a counterweight end 29, and a rod journal receptacle 1. A rod journal 13 is rotatably mounted within the rod journal receptacle 1 of the eccentric counterweight 2.

Figure 11A:
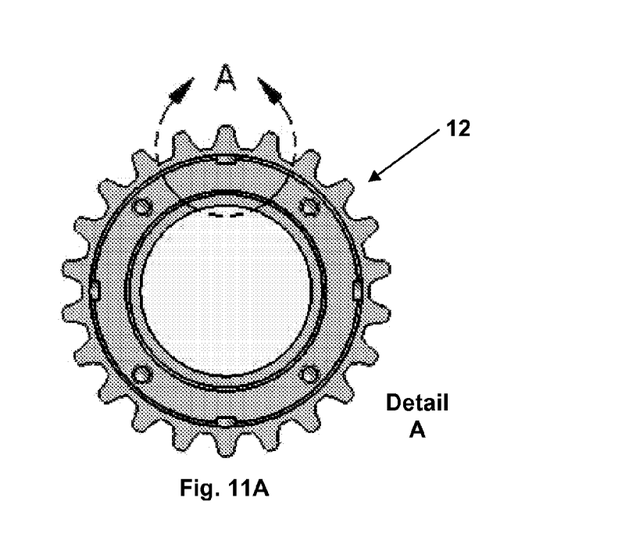
FIGS. 11A-11B: Diagrammatic View of Sprocket Tooth Profile
Figure 11B:
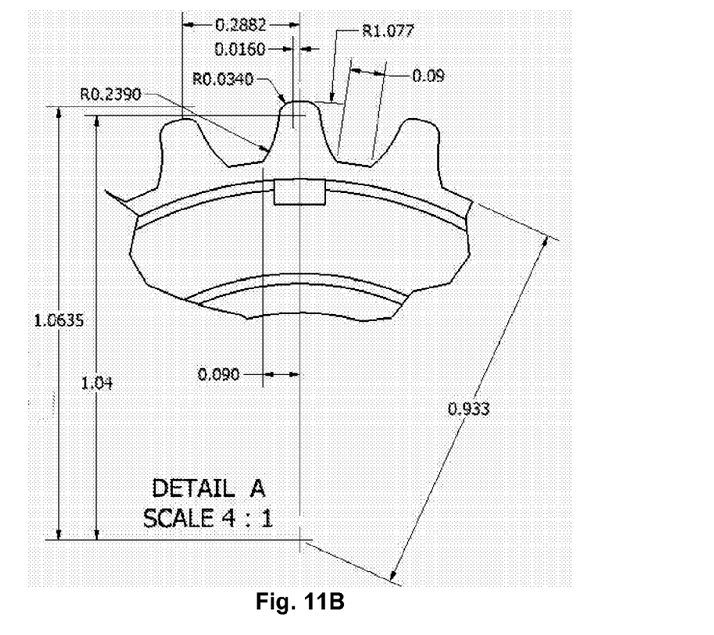

The rotation of the eccentric counterweight 2 and crank arm counterweight 30 are interdependent and must be appropriately balanced and positioned to facilitate the proper functioning of the unit. The relationship between these components requires adjustment of the apparatus during final assembly. In order to properly balance the apparatus, a mass or combination of masses is positioned on the counterweight end 29 of the eccentric counterweight 2. This can be accomplished by affixing a counterweight mass 33 to the eccentric counterweight 2 or by fabricating a one-piece eccentric counterweight 2 with an appropriate mass on the counterweight end 29. Referring now to FIG. 11, in the balancing process, the eccentric counterweight 2 is first rotated about its center of gravity and observed for imbalance. The counterweight mass 33 is increased and/or moved along the centerline 31 of the eccentric counterweight 2 in a trial and error fashion until the component is properly balanced.

Figure 2:
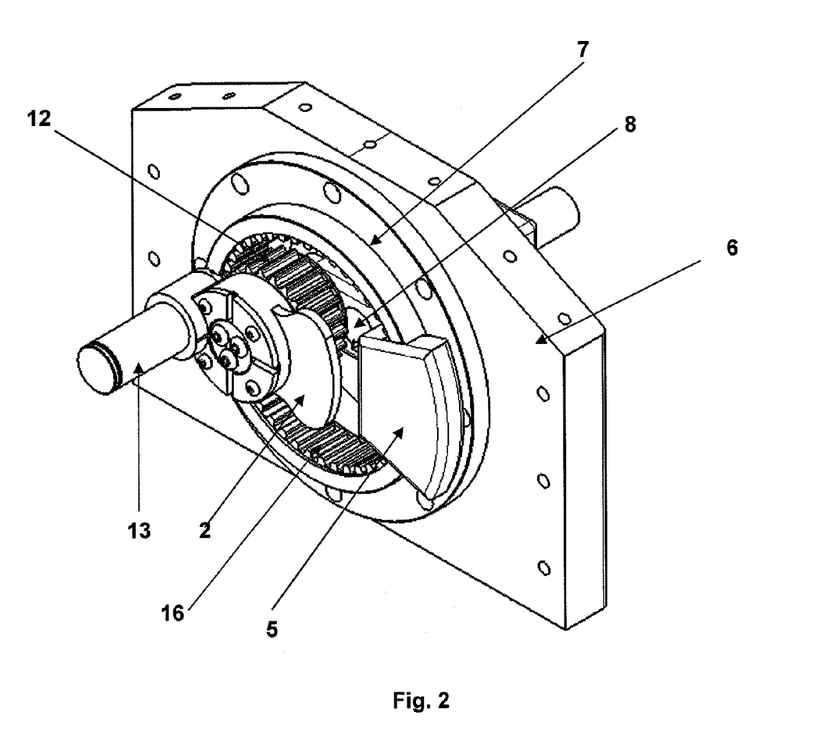
FIG. 2: Diagrammatic View of the Present Invention Detailing the Crank Arm Assembly, Eccentric Counterweight and Continuous Synchronous Belt
Figure 3:
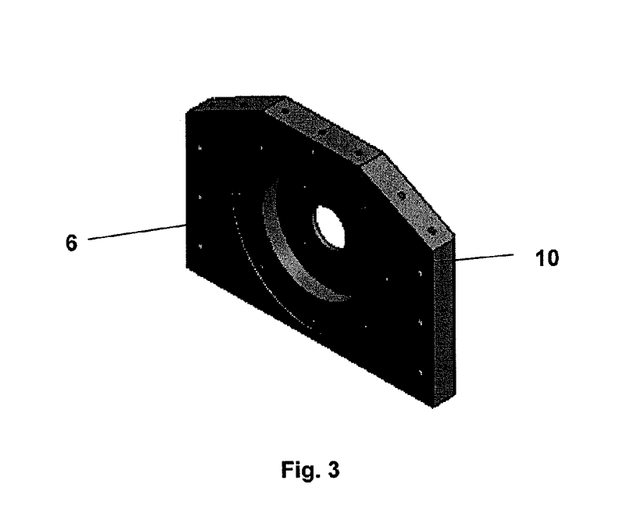
FIG. 3: Diagrammatic View of the Crankcase Housing
Figure 4A:
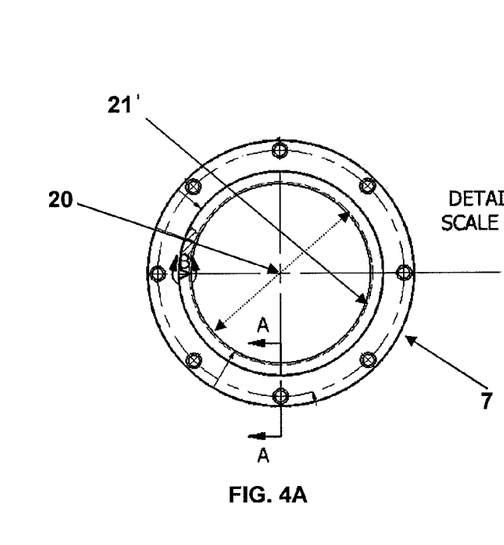
FIGS. 4A-4B: Diagrammatic Views of the Circular Mounting Flange
Figure 4B:
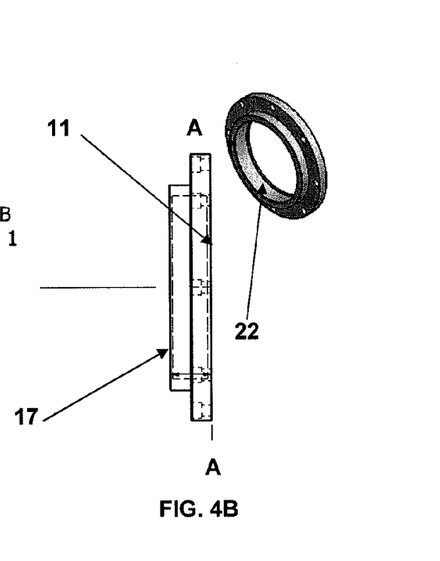
Figure 10:
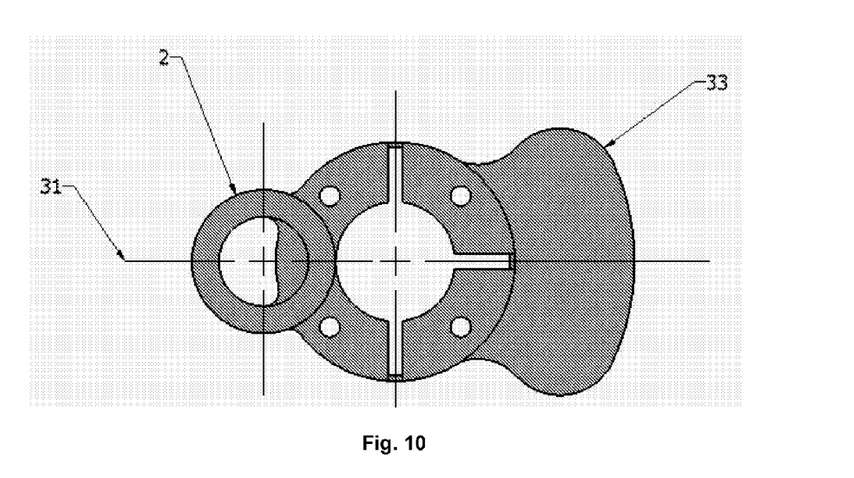
FIG. 10: Diagrammatic View of Eccentric Counterweight Mass Positioning

Prior to initial operation, the device should be oriented such that the centerline 31 of the eccentric counterweight 2 and the centerline 24 of the crank arm counterweight 30 are in alignment when the rod journal 13 arrives at its travel extreme as shown in FIG. 2. Once the proper orientation has been achieved, the crank arm counterweight 30 must be balanced. The balancing procedure is similar to that described for the mass 33 of the eccentric counterweight 2. Referring now to FIG. 10, the crank arm counterweight 30 is rotated about its center of gravity and observed for imbalance. The mass 32 is increased and/or moved along the centerline 24 of the crank arm counterweight 30 until balance is achieved.

Description of Operation

As the rotary motion shaft 18 revolves, the affixed crank arm assembly 5 rotates, allowing the attached sprocket shaft 15 and rotatably mounted sprocket 12 to orbit in the direction of input shaft rotation, while the sprocket engagement drives simultaneous opposite directional rotation of the sprocket 12 within the inner circumference 21 of the circular mounting flange 7. The teeth of the sprocket 12 engage with the teeth of the continuous synchronous belt 16, thereby coordinating the motion of the components within the hypocycloidal cranking apparatus.

The eccentric counterweight 2 affixed to the sprocket shaft 15 rotates in unison with the sprocket shaft 15. The rod journal 13, which is rotatably mounted within the eccentric counterweight 2, spins as the components behind it orbit within the circular mounting flange 7. This action allows the rod journal 13 to follow only the horizontal path of the eccentric counterweight 2 motion, thereby completing the translation of rotational motion from the rotary motion shaft 18 into rectilinear motion of the rod journal 13.

It will be apparent to those skilled in the art to which the invention pertains that variations and modifications of the embodiments shown and described herein may be made without departing from the spirit and scope of the invention. Accordingly, it is intended that the invention be limited only to the extent required by the appended claims and the applicable rules of law.

What is claimed is:
1. A hypocycloidal cranking apparatus comprising:
a) a crankcase housing;
b) a synchronous belt assembly comprising:
  i) a circular mounting flange comprising an inner surface, a front face, and a back face, the back face being mechanically secured to said crankcase housing, the circular mounting flange having an axis of rotation at its geometric center; and
  ii) a continuous synchronous belt having an inner toothed surface and an outer substantially smooth surface and having a first defined pitch diameter, the belt being oriented such that said outer surface is seated against the flange inner surface;
c) a rotary motion shaft positioned along the axis of rotation of the circular mounting flange and having an input end and an output end, said input end being mechanically supported by said crankcase housing and adapted for connection to a power source, said output end passing through said crankcase housing and terminating prior to the plane of said inner face of said circular mounting flange;
d) a crank arm assembly positioned within said crankcase housing comprising:
  i) a crank arm having a counterweight end, a crank arm sprocket end and a centerline, the crank arm having a rotary shaft receptacle and a sprocket shaft receptacle, both receptacles being centered on said centerline, said rotary shaft receptacle being positioned between said counterweight end and said sprocket shaft receptacle and mechanically affixed to said rotary motion shaft such that the output end of said rotary motion shaft terminates within said rotary shaft receptacle; and
  ii) a sprocket shaft having a crank arm end and a sprocket shaft sprocket end, the crank arm end being mechanically fixed to the sprocket shaft receptacle of said crank arm;
e) a rod journal shaft assembly comprising:
  i) a toothed orbiting sprocket rotatably mounted on said sprocket shaft and having a second defined pitch diameter and being mounted near the crank arm end of said sprocket shaft and meshing with said continuous synchronous belt;
  ii) an eccentric counterweight having a counterweight end and a rod journal end, said eccentric counterweight being mechanically affixed to the sprocket shaft sprocket end of said sprocket shaft and having a rod journal receptacle positioned near the rod journal end of said eccentric counterweight; and
f) a rod journal mechanically fixed to said rod journal receptacle of said eccentric counterweight and adapted for connection to a piston.

2. The apparatus of claim 1 wherein the inner surface of the circular mounting flange has a continuous, substantially coplanar trough recessed within the perimeter of said inner surface and wherein the continuous synchronous belt is seated within said trough.

3. The apparatus of claim 2 wherein the pitch diameter of the orbiting sprocket is substantially one half the pitch diameter of the continuous synchronous belt.

4. The apparatus of claim 1 wherein the pitch diameter of the orbiting sprocket is substantially one half the pitch diameter of the continuous synchronous belt.

\* \* \* \* \*